(12) United States Patent
Manjome et al.

(10) Patent No.: US 8,978,054 B2
(45) Date of Patent: Mar. 10, 2015

(54) CARTRIDGE FOR ACCOMODATING A DISC-SHAPED RECORDING MEDIUM

(71) Applicant: Sony Corporation, Tokyo (JP)

(72) Inventors: Naohisa Manjome, Miyagi (JP); Hiroshi Nakayama, Miyagi (JP); Hiroyuki Takemoto, Miyagi (JP); Jiro Fujiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/087,028

(22) Filed: Nov. 22, 2013

(65) Prior Publication Data

US 2014/0165080 A1 Jun. 12, 2014

(30) Foreign Application Priority Data

Dec. 7, 2012 (JP) ................... 2012-268487

(51) Int. Cl.
*G11B 23/03* (2006.01)
*G11B 17/22* (2006.01)

(52) U.S. Cl.
CPC ........ *G11B 23/0328* (2013.01); *G11B 23/0323* (2013.01); *G11B 17/22* (2013.01)

USPC .......................................... 720/726

(58) Field of Classification Search
USPC ........ 720/614, 615, 655, 725–728; 369/192.1
See application file for complete search history.

(56) References Cited

U.S. PATENT DOCUMENTS

| | | | |
|---|---|---|---|
| 5,200,938 A * | 4/1993 | Akiyama et al. ............ 369/30.83 |
| 2007/0079320 A1* | 4/2007 | Haga et al. .................... 720/725 |
| 2009/0055847 A1* | 2/2009 | Hasegawa et al. ............ 720/614 |

FOREIGN PATENT DOCUMENTS

JP 2011-108312 A 6/2011

* cited by examiner

*Primary Examiner* — Joseph Feild
*Assistant Examiner* — Gustavo Polo
(74) *Attorney, Agent, or Firm* — Sony Corporation

(57) ABSTRACT

There is provided a cartridge including a running portion which causes both end portions of a disc-shaped recording medium to run, and a pressing portion which presses one end portion of the disc-shaped recording medium to press the other end portion against the running portion. Static friction coefficients of a portion of the pressing portion coming in contact with the one end portion and a portion of the running portion coming in contact with the other end portion are different.

13 Claims, 13 Drawing Sheets

FIG. 7
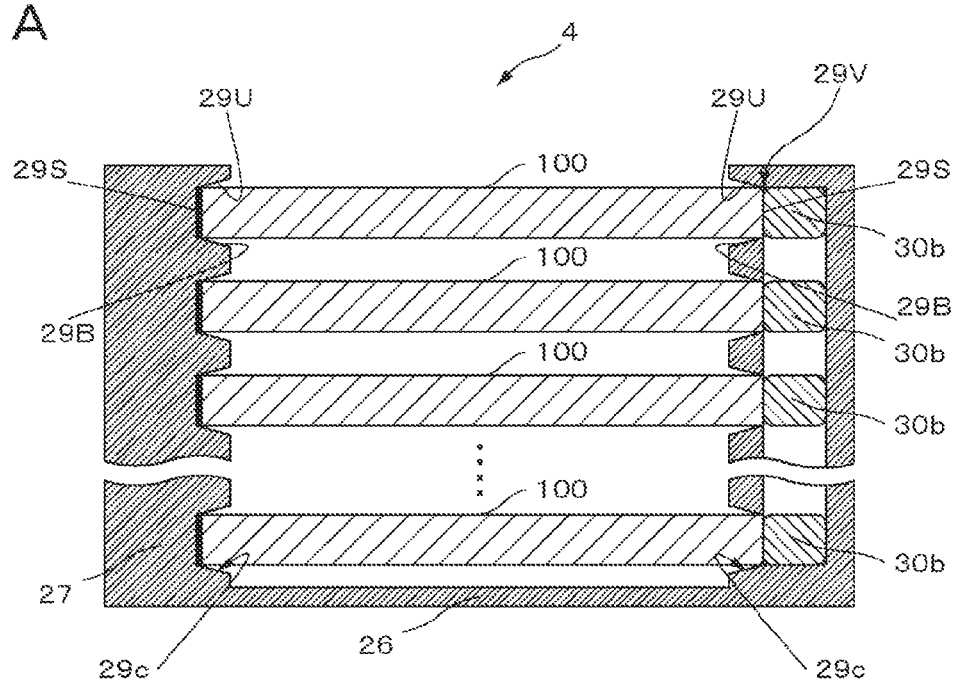
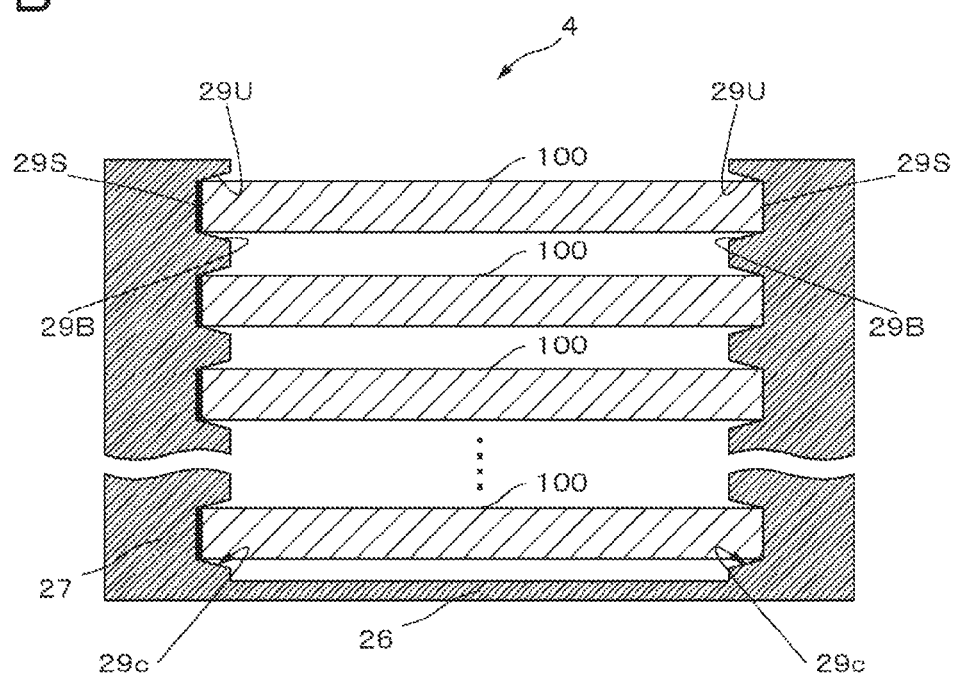

FIG. 9
A
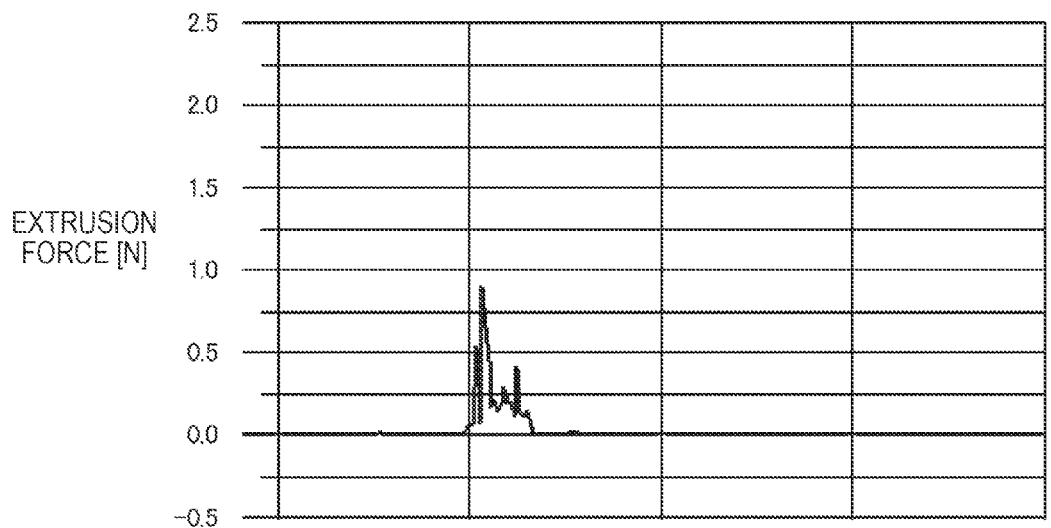
B
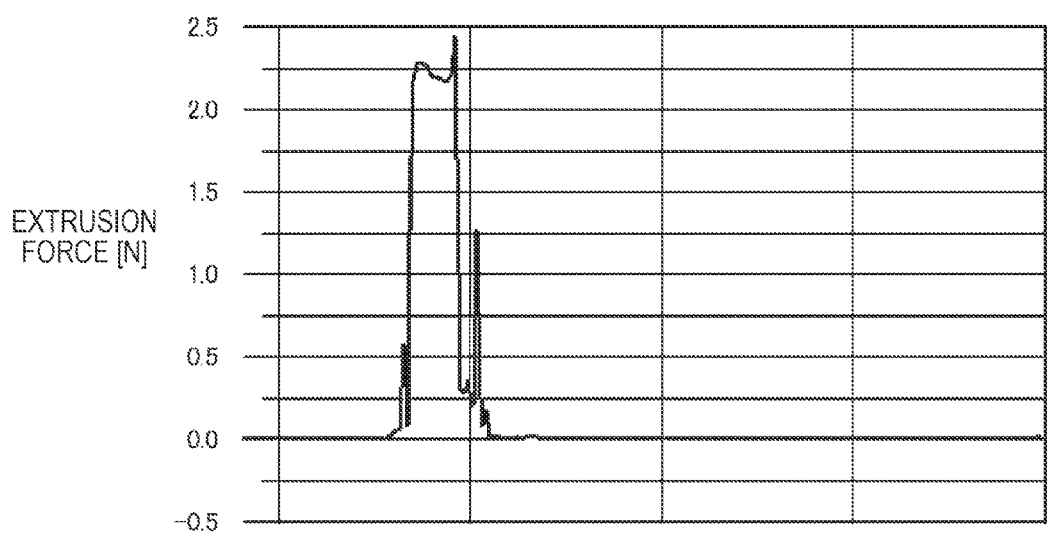

FIG. 14
A
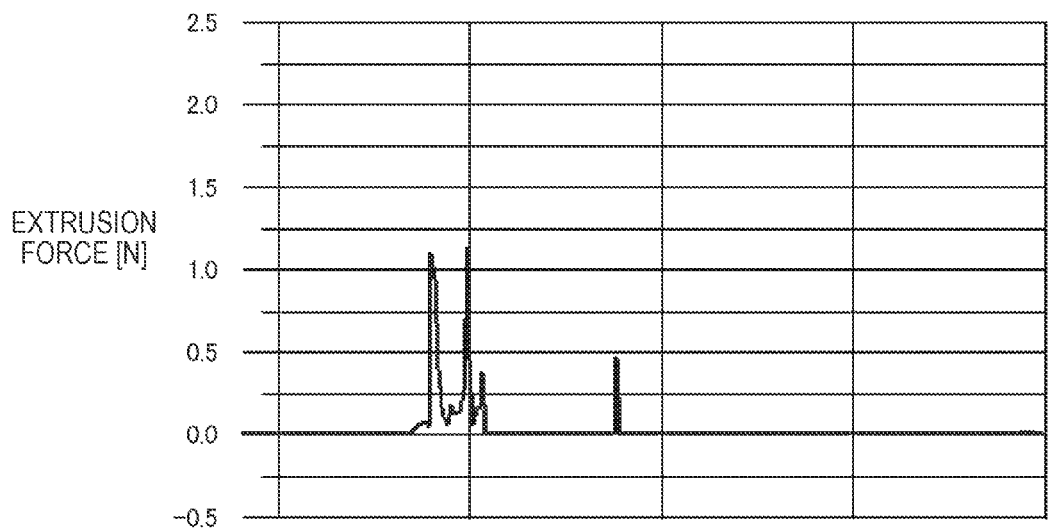
B
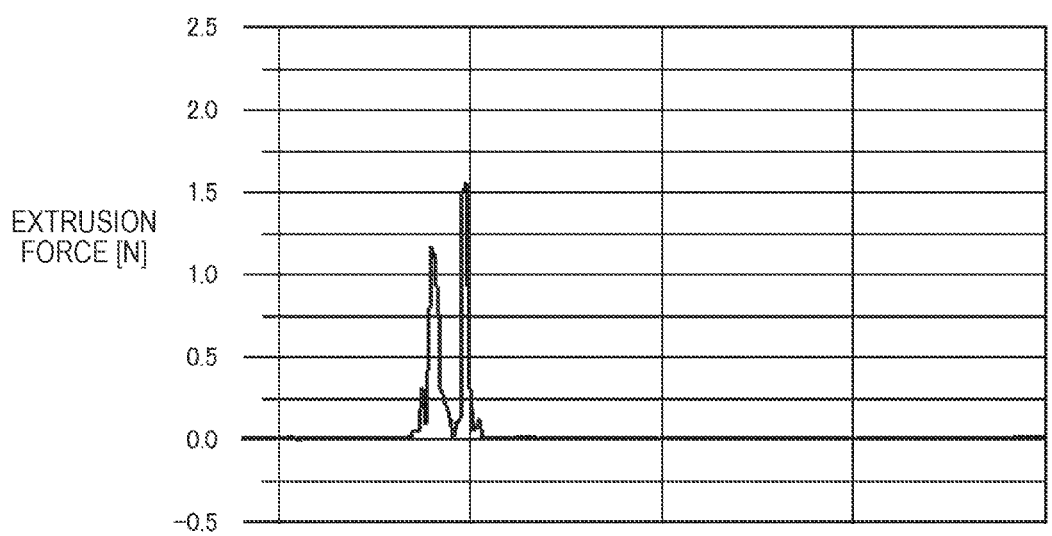

FIG. 15
A
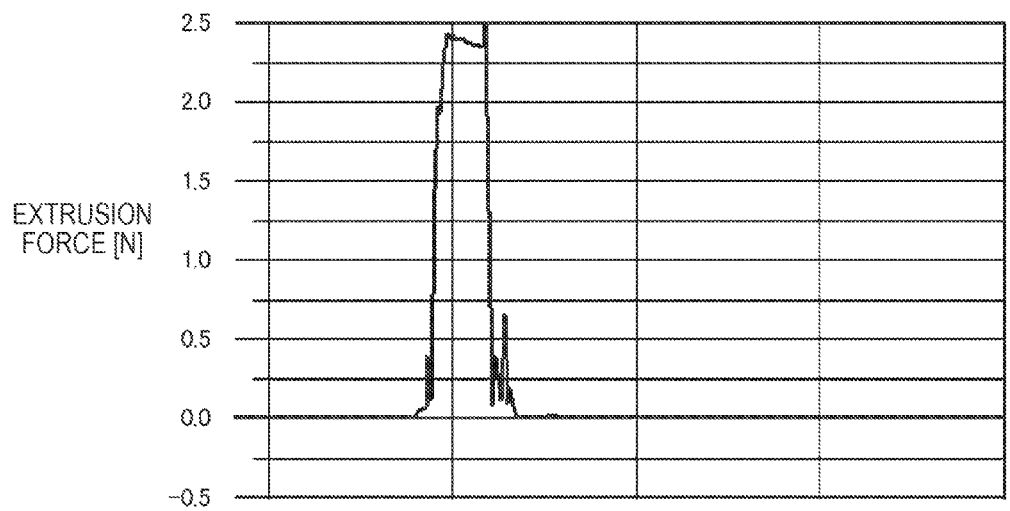
B
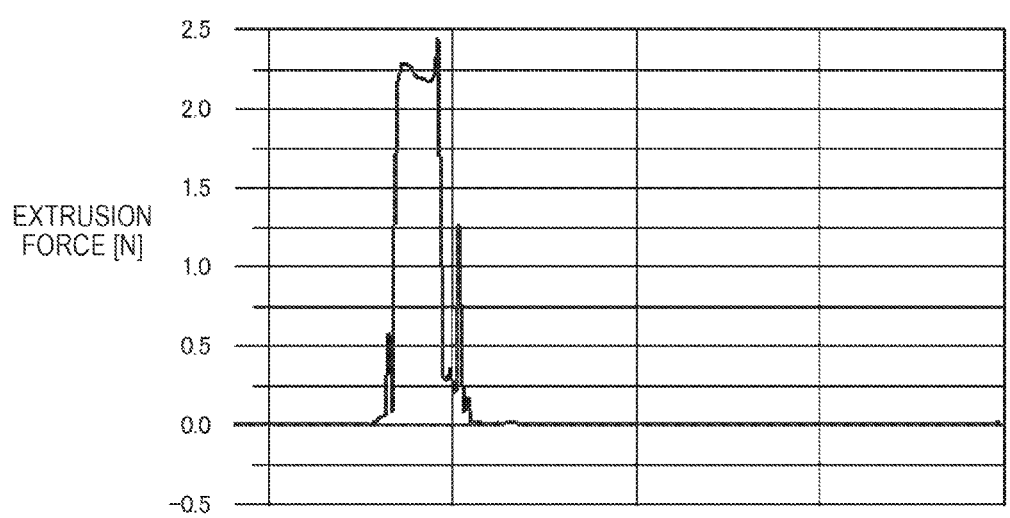

CARTRIDGE FOR ACCOMODATING A DISC-SHAPED RECORDING MEDIUM

CROSS REFERENCE TO RELATED APPLICATIONS

This application claims the benefit of Japanese Priority Patent Application JP 2012-268487 filed Dec. 7, 2012, the entire contents of which are incorporated herein by reference.

BACKGROUND

This technology relates to a cartridge and a recording and reproducing apparatus. Specifically, the technology relates to a cartridge in which a disc-shaped recording medium is accommodated.

In related art, a cartridge which accommodates a plurality of disc-shaped recording media is known. Recording or reproducing of an information signal in the disc-shaped recording medium in this cartridge is performed by a recording and reproducing apparatus called a changer. The changer takes out a desired one of the plurality of disc-shaped recording media in a loaded cartridge and performs recording or reproducing of the information signal in the disc-shaped recording medium.

Technology for pressing one end of an optical disc with an elastic piece (self-lock spring) and regulating the optical disc in a reception position in a main body of a cartridge is described in Japanese Patent Laid-Open No. 2011-108312. Further, preventing companion ejection in which other laser discs are ejected with the ejection of a predetermined optical disc by an extrusion lever and regulating rocking of other optical discs during reception are disclosed in Japanese Patent Laid-Open No. 2011-108312.

SUMMARY

However, when a configuration for fixing a position of the disc-shaped recording medium using a self-lock spring is used, the disc-shaped recording medium may not be stably ejected from the cartridge.

Therefore, it is desirable to provide a cartridge and a recording and reproducing apparatus capable of stably ejecting a disc-shaped recording medium.

According to an embodiment of the present disclosure, there is provided a cartridge including a running portion which causes both end portions of a disc-shaped recording medium to run, and a pressing portion which presses one end portion of the disc-shaped recording medium to press the other end portion against the running portion. Static friction coefficients of a portion of the pressing portion coming in contact with the one end portion and a portion of the running portion coming in contact with the other end portion are different.

According to an embodiment of the present disclosure, there is provided a recording and reproducing apparatus including a running portion which causes both end portions of a disc-shaped recording medium to run, a first pressing portion which presses one end portion of the disc-shaped recording medium to press the other end portion against the running portion, and a second pressing portion which presses the disc-shaped recording medium to cause the recording medium to run. Static friction coefficients of a portion of the first pressing portion coming in contact with the one end portion and a portion of the running portion coming in contact with the other end portion are different.

According to this technology, it is possible to provide a cartridge and a recording and reproducing apparatus capable of stably ejecting a disc-shaped recording medium.

BRIEF DESCRIPTION OF THE DRAWINGS

FIG. 7A is a cross-sectional view taken along a line A-A illustrated in FIG. 6, which illustrates an example of a state in which a recording medium is accommodated in a cartridge according to an embodiment of this technology. FIG. 7B is a cross-sectional view taken along a line B-B illustrated in FIG. 6, which illustrates an example of a state in which a recording medium is accommodated in a cartridge according to an embodiment of this technology;

FIGS. 9A and 9B are schematic diagrams illustrating a change in force generated when a recording medium is ejected from a cartridge;

FIG. 14A is a schematic diagram illustrating a change in force when a recording medium is extruded from the cartridge of Embodiment 2-1, and FIG. 14B is a schematic diagram illustrating a change in force when the recording medium is extruded from the cartridge of Embodiment 2-2; and FIG. 15A is a schematic diagram illustrating a change in force when a recording medium is extruded from a cartridge of a reference example, and FIG. 15B is a schematic diagram illustrating a change in force when the recording medium is extruded from a cartridge of Comparison Example 2.

DETAILED DESCRIPTION OF THE EMBODIMENT(S)

Figure 1:
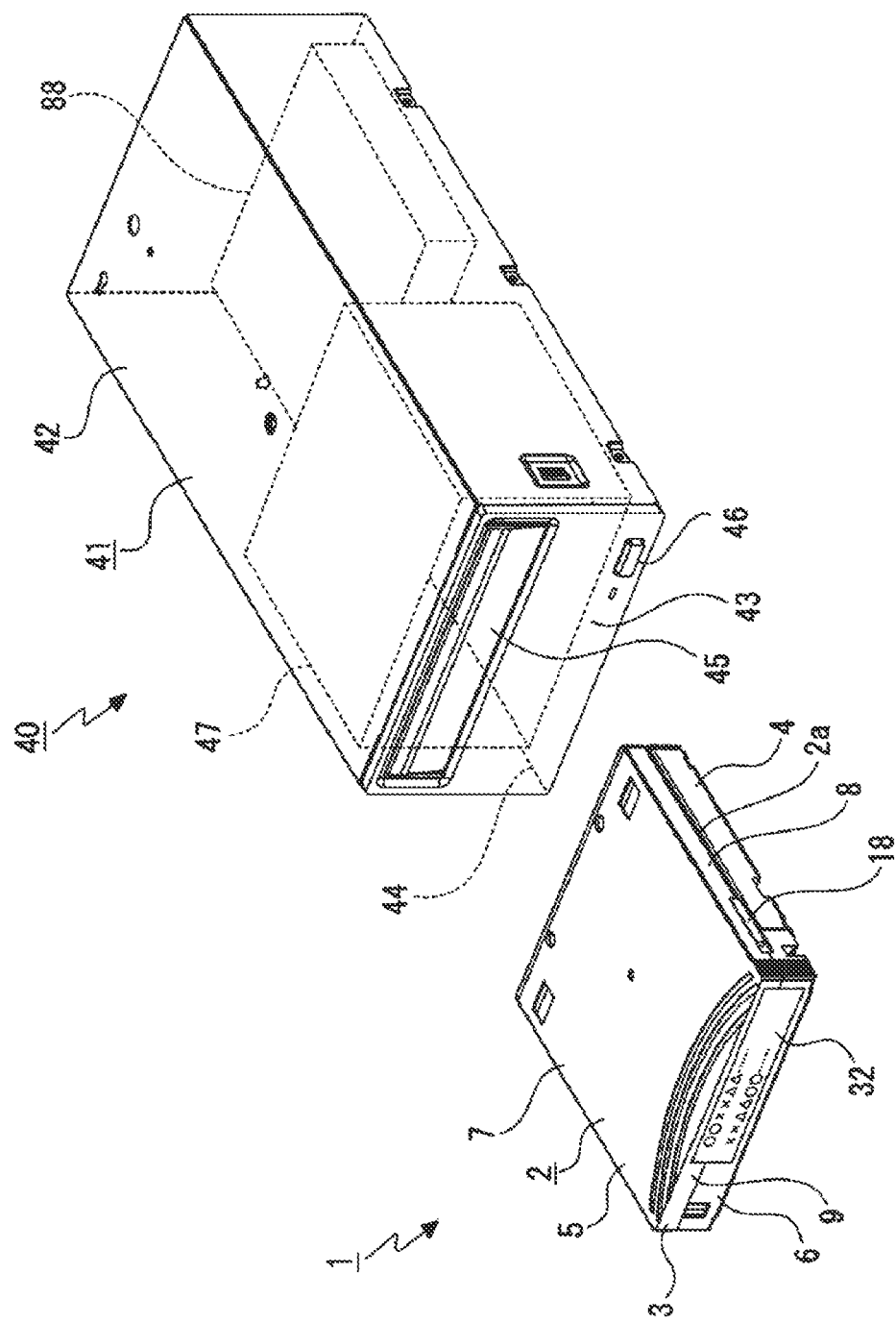
FIG. 1 is a perspective view illustrating an example of a cartridge and a recording and reproducing apparatus according to an embodiment of this technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments which will be described below are suitable specific examples of this technology, and various technically desirable limitations are made. However, the scope of this technology is not particularly limited to these embodiments unless it is specifically described that something is limiting to this technology.

Further, the description of this technology is given in the following order.
<An embodiment of the technology>
[1. Configuration of recording and reproducing apparatus]
[2. Configuration of cartridge]
[3. Separation mechanism for cartridge]
[4. Ejection mechanism of recording medium]
<An Embodiment of this Technology>
[1. Configuration of Recording and Reproducing Apparatus]

First, a cartridge and a recording and reproducing apparatus according to an embodiment of this technology will be schematically described. FIG. 1 illustrates a disc cartridge 1 as an example of a cartridge in which a recording medium is accommodated, and a changer 40 as an example of a recording and reproducing apparatus which performs recording and reproducing of information in the recording medium accommodated in the disc cartridge 1 of this technology. The disc cartridge 1 will be described below in detail. Further, in the following description, front, rear, up, down, left and right directions are indicated by defining a direction in which the disc cartridge 1 is inserted from a cartridge insertion/ejection opening of the changer 40 as a front for convenience.

In the changer 40, respective necessary portions are arranged inside an outer casing 41. The outer casing 41 includes an outer frame 42 that opens backward and downward, a panel 43 attached to a rear end portion of the outer frame 42 and directed in a back-and-forth direction, and a base frame 44 attached to a lower end portion of the outer frame 42 and directed in a vertical direction.

A cartridge insertion/ejection opening that penetrates back and forth is formed in an upper end portion of the panel 43 and can be opened or closed by a shutter 45. An eject button 46 is arranged in the lower end portion of the panel 43.

A disc holder 47 is arranged as a cartridge accommodation portion inside the outer casing 41. The disc holder 47 includes an upper holder which is not illustrated, and a lower holder which is not illustrated herein. Meanwhile, the cartridge of this technology can be coupled or separated, for example, in a vertical direction, as will be described below. The disc cartridge 1 includes, for example, an upper shell of a first shell 3, and, for example, a lower shell of a second shell 4. Also, when the disc cartridge 1 is inserted into the changer 40, the first shell 3 is held in the upper holder and the second shell 4 is held in the lower holder.

A recording and reproducing unit (drive) 88 as an optical unit (a pickup) which performs recording or reproducing of an information signal in the recording medium is arranged in a lower end portion on a front side inside the outer casing 41. A plurality of recording and reproducing units 88 may be provided.

[2. Configuration of Cartridge]

Figure 2:
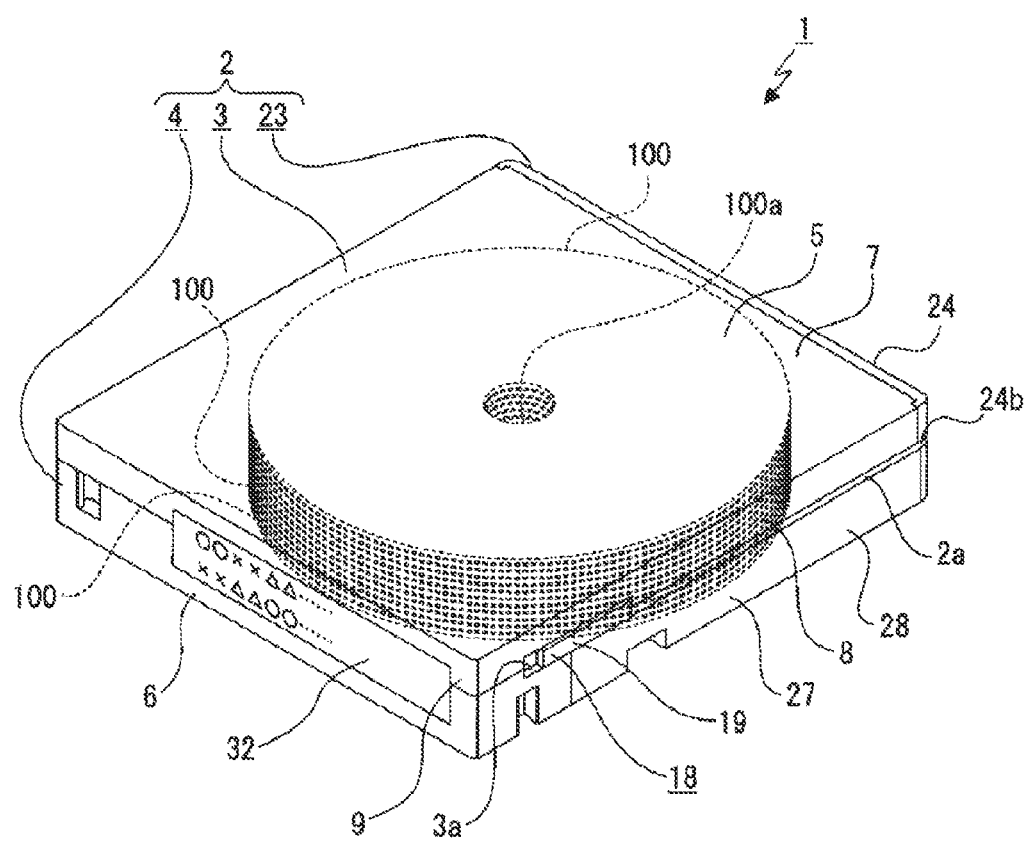
FIG. 2 is a perspective view illustrating an example of a cartridge according to an embodiment of this technology.
Figure 3:
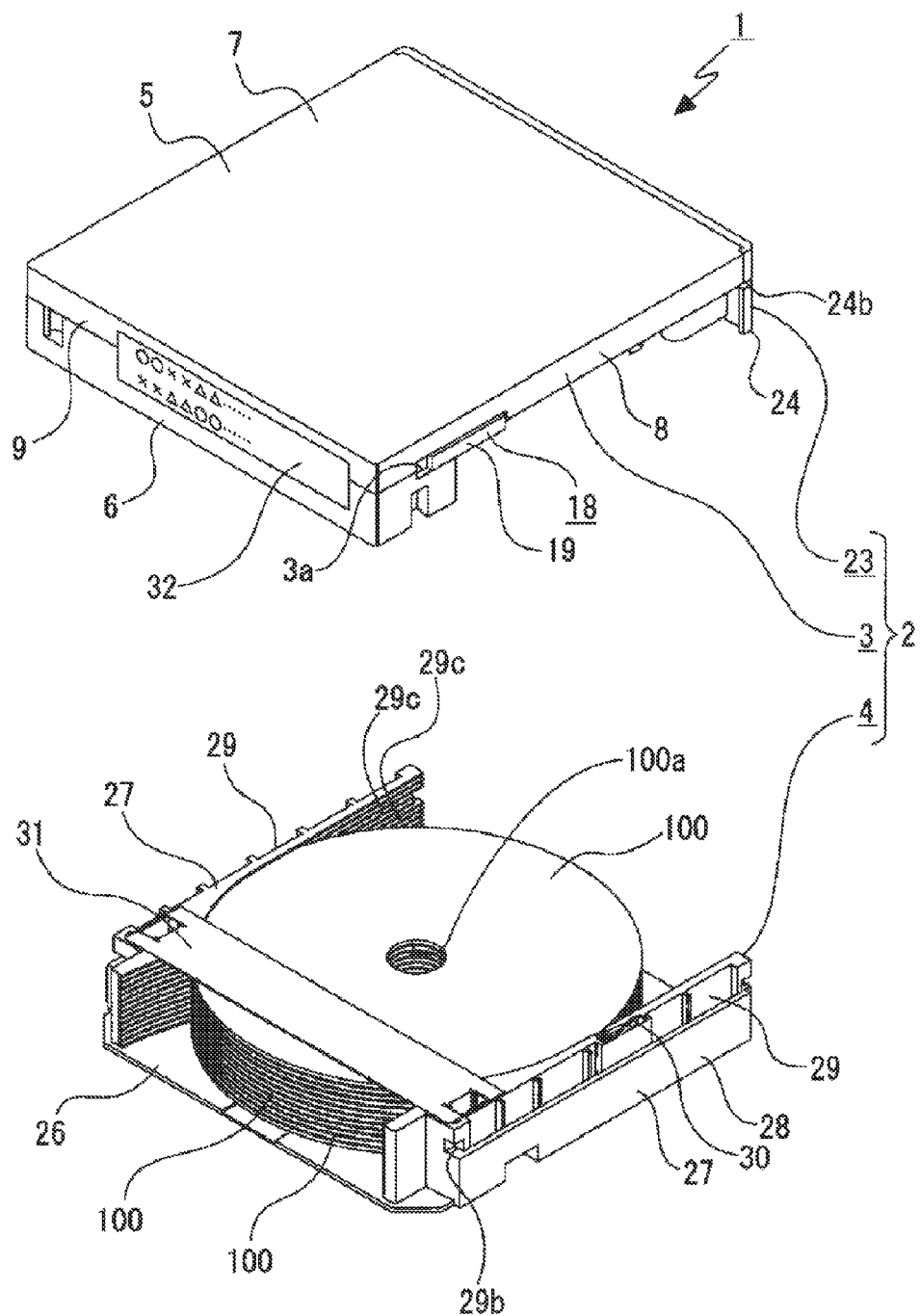
FIG. 3 is a perspective view illustrating an example of a state in which a cartridge is separated according to an embodiment of this technology.
Figure 4:
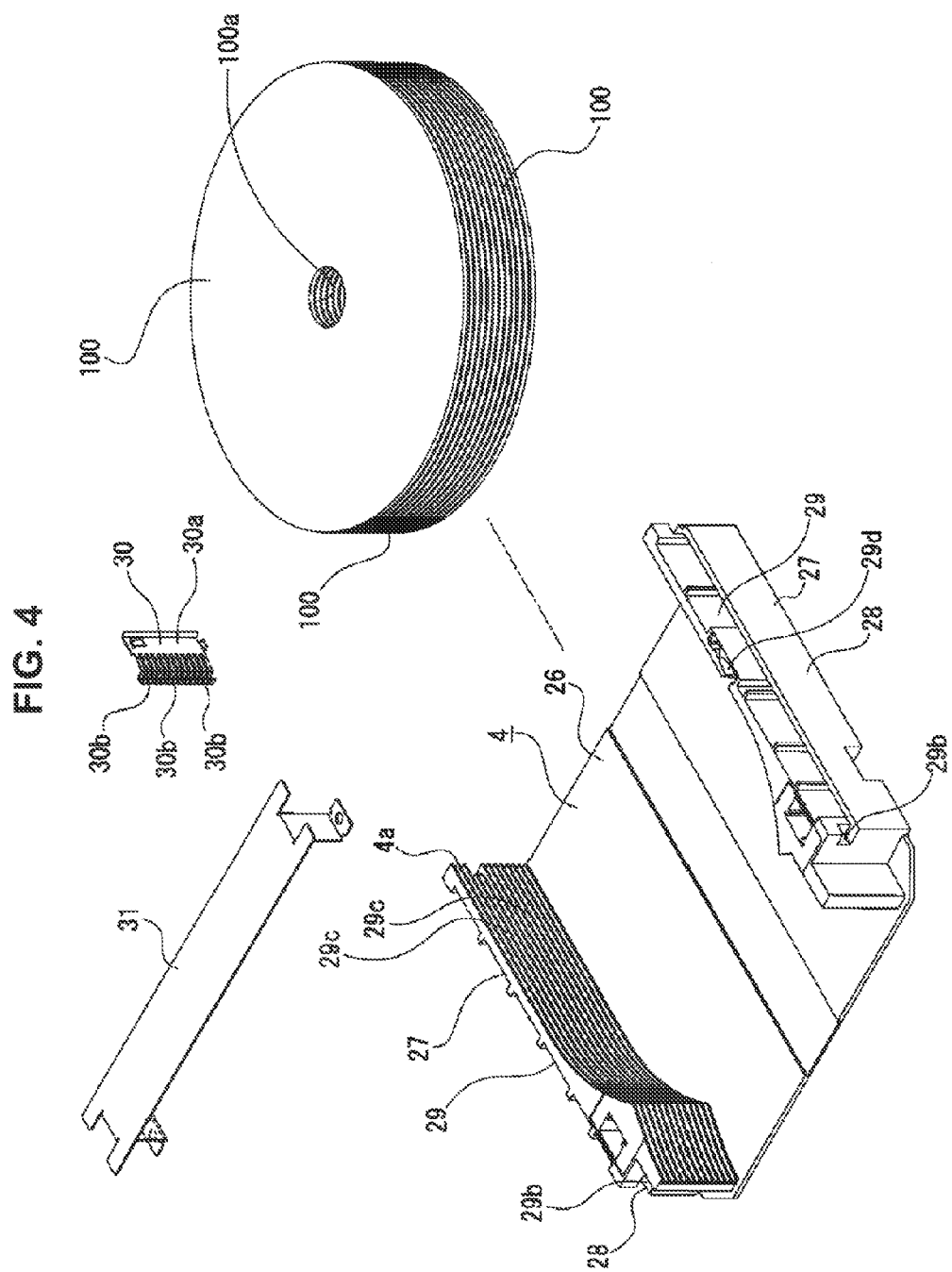
FIG. 4 is an exploded perspective view illustrating an example of a state in which a cartridge is separated according to an embodiment of this technology.

Next, a configuration of a cartridge according to an embodiment of this technology will be described. FIG. 2 illustrates the disc cartridge 1 as an example of the cartridge. FIG. 3 illustrates an example of a state in which the cartridge is separated. FIG. 4 illustrates an example of elements of the separated cartridge.

In the disc cartridge 1, respective necessary portions are arranged inside a case body 2 as an accommodation body. The case body 2 includes a first shell 3 and a second shell 4. For example, disc-shaped recording media 100, 100, . . . which are recording media having a disc shape can be accommodated at equal intervals in a vertical direction inside the case body 2. For example, a BD (Blu-ray Disc) may be used or a DVD (Digital Versatile Disc) may be used for the disc-shaped recording medium 100. A magnetic information recording medium, a magneto-optical information recording medium or the like, as well as the optical information recording medium described above, may be used for the disc-shaped recording medium 100.

For example, an upper shell of the first shell 3 and, for example, a lower shell of the second shell 4 can be coupled or separated in a vertical direction (see FIG. 3). Further, the first shell 3 and the second shell 4 may have a form in which the first shell 3 and the second shell 4 are coupled or separated in a different direction, e.g., a horizontal direction.

The first shell 3 is formed of a resin material, and includes a base body 5 and a subsidiary base 6 attached to a rear end portion of the base body 5, which are coupled in a vertical direction (see FIG. 3).

The base body 5 includes a vertically directed base face portion 7, side face portions 8 and 8 respectively projected downward from both left and right end portions of the base face portion 7, and a rear face portion 9 projected downward from a rear end portion of the base face portion 7, as illustrated in FIG. 3.

A round shaft-shaped center pin projected downward is provided in a central portion of the base face portion 7.

Slider support portions 3a and 3a are formed in positions near a rear end in both left and right side face portions of the first shell 3, respectively.

The lock sliders 18 and 18 are supported to be slidable in a back-and-forth direction by the slider support portions 3a and 3a of the first shell 3, respectively. The lock slider 18 includes a supported portion 19 extending back and forth, a lock portion, not illustrated, projected inwardly from a portion other than a front end portion of the supported portion 19, and a spring support shaft portion, not illustrated, projected from a rear face of the lock portion to a rear side. In the lock sliders 18 and 18, the supported portions 19 and 19 are supported to be slidable by the slider support portions 3a and 3a of the first shell 3, respectively, and coil springs, not illustrated, are supported by the spring support shaft portions. Both ends of the coil spring come in contact with a rear surface of the lock portion and a rear surface forming the slider support portion, respectively. Therefore, the lock slider 18 is urged forward by the coil spring.

An opening and closing panel 23 is attached to a front end portion of the first shell 3. The opening and closing panel 23 includes a panel portion 24 formed in a rectangular plate shape which is long from side to side and is directed in a back-and-forth direction. Insertion notches 24b and 24b opened outward are formed in both left and right end portions of the panel portion 24, respectively.

The second shell 4 is formed of a resin material or the like, and includes a base face portion 26 directed in a vertical direction, and side face portions 27 and 27, respectively projected upward from both left and right end portions of the base face portion 26, which are formed integrally (see FIGS. 3 and 4).

The side surface portion 27 includes an outer side wall portion 28, and an inner side wall portion 29 located on an inner side of the outer side wall portion 28. A height of the outer side wall portion 28 is substantially half of a height of the inner side wall portion 29, and an upper surface of the outer side wall portion 28 is lower from an upper surface of the inner side wall portion 29.

A second lock recess portion 29b that opens backward and outward is formed in a position near a rear end of the inner side wall portion 29.

Disc running grooves 29c, 29c, . . . are formed as running portions of the disc-shaped recording medium 100 in an inner surface of the inner side wall portion 29, and the disc running grooves 29c, 29c, . . . are located to be spaced at equal intervals in a vertical direction.

A spring attachment recess portion 29d is formed in one of the inner side wall portions 29 (see FIG. 4). The spring attachment recess portion 29d opens upward and inward.

A self-lock spring 30 is inserted into the spring attachment recess portion 29d and attached (see FIG. 4). For example, the self-lock spring 30 includes a plate-shaped attached portion 3a which is vertically long, and spring portions 30b, 30b, . . . as elastic bodies projected from a rear edge of the attached portion 30a, which are integrally formed of a resin material, for example, as illustrated in FIG. 4. The resin material is not particularly limited as long as the resin material has elasticity, but includes, for example, a rubber resin material. Further, the self-lock spring 30 may be formed of a metal material, as well as the resin material. Further, it is preferable for a static friction coefficient of the self-lock spring 30 to be greater than the static friction coefficient of the side surface portions 27 and 27. The spring portions 30b, 30b, . . . are provided to be spaced at equal intervals in a vertical direction at the same interval as the vertical interval between the disc running grooves 29c, 29c, . . . and are provided in the same number as the disc running grooves 29c, 29c, . . . .

The self-lock spring 30 is inserted into the spring attachment recess portion 29d, and front end portions of the spring portions 30b, 30b, . . . are projected on an inner side of the inner side wall portion 29.

A bridge member 31 is attached in a position near a rear end between the side surface portions 27 and 27 of the second shell 4 (see FIGS. 3 and 4). The bridge member 31 is formed by bending a plate-shaped metal material in a predetermined shape. As the bridge member 31 is attached between the side surface portions 27 and 27, strength of the second shell 4 as a whole can be secured.

In the disc cartridge 1, for example, an information input sheet 32 is attached as an information input means to a rear face of the case body 2. Predetermined information, e.g., information on a pitch between disc-shaped recording media 100, 100, . . . received inside the case body 2 and a reception number of disc-shaped recording media 100, 100, . . . is input to the information input sheet 32. Further, the information input means is not limited to the information input sheet 32 and, for example, printing information of a bar code printed on the case body 2 or the like, a recording chip buried in the case body 2, or the like may be appropriately used.

In the disc cartridge 1 configured as above, the disc-shaped recording media 100, 100, . . . are held inside the case body 2 (see FIGS. 2 and 3). The disc-shaped recording medium 100 is held inside the case body 2 as its outer peripheral portion is inserted into the disc running grooves 29c and 29c formed in the side surface portions 27 and 27 of the second shell 4 from the front side in a state in which the first shell 3 and the second shell 4 are separated. Therefore, an opening located in a front end of the second shell 4 is formed as the disc insertion/ejection opening 4a through which insertion and removal of the disc-shaped recording media 100, 100 . . . into or from the second shell 4 is performed.

In a state in which the first shell 3 and the second shell 4 are coupled and the opening and closing panel 23 is attached to the first shell 3 to constitute the case body 2, insertion grooves 2a and 2a extending back and forth are formed between a lower surface of the side surface portions 8 and 8 in the first shell 3 and an upper surface of the outer side wall portions 28 and 28 in the second shell 4, respectively (see FIG. 2). In the insertion grooves 2a and 2a, rear ends are continuous to the slider support portions 3a and 3a of the first shell 3, respectively and front ends are continuous to the insertion notches 24b and 24b formed in the panel portion 24 of the opening and closing panel 23, respectively.

The first shell 3 and the second shell 4 are coupled in a state in which the base face portion 7 of the base body 5 and the base face portion 26 face vertically.

In a state in which the first shell 3 and the second shell 4 are coupled, the first shell 3 and the second shell 4 are locked by the lock sliders 18 and 18.

The lock sliders 18 and 18 are located in a movable end on the front side by the urging force of the coil spring which is not illustrated, and locking portions which are not illustrated are inserted into and engaged with lock recess portions 29b and 29b formed in the side surface portions 27 and 27 of the second shell 4. Further, other locking mechanisms may also be provided, for example, in positions of a rear face of the panel portion 24 separately from the lock sliders 18 and 18.

As described above, in a state in which the first shell 3 and the second shell 4 are coupled and locked and the disc-shaped recording media 100, 100, . . . are held inside the case body 2, the spring portions 30b, 30b, . . . of the self-lock spring 30 contact and press portions of the outer peripheral surfaces of the disc-shaped recording media 100, 100, . . . , respectively. In this case, other portions in the outer peripheral surfaces of the disc-shaped recording media 100, 100, . . . are pressed against portions of the disc running grooves 29c, 29c, . . . , and the disc-shaped recording media 100, 100, . . . are positioned in normal positions inside the case body 2.

The center pin, not illustrated, provided in the first shell 3 is inserted into the central holes 100a, 100a . . . of the disc-shaped recording media 100, 100, . . . in the state in which the first shell 3 and the second shell 4 are coupled.

[3. Separation Mechanism for Cartridge]

Next, a cartridge separation mechanism, namely, a process up to entrance to a state in which a cartridge is separated and a recording medium accommodated in the cartridge can be inserted and removed will be described.

If the disc cartridge 1 is inserted from the cartridge insertion/ejection opening of the panel 43, the disc cartridge 1 is inserted into the disc holder 47 from the rear side (see FIG. 1). When the disc cartridge 1 is inserted from the cartridge insertion/ejection opening of the panel 43, the shutter 45 is pressed and rotated (see FIG. 1).

If the disc cartridge 1 is inserted into the disc holder 47 from the rear side, a release piece of the upper holder, which is not illustrated, and a holding piece of the lower holder, which is not illustrated, are inserted into the insertion grooves 2a and 2a formed in the case body 2.

If the release pieces are inserted into the insertion grooves 2a and 2a, respectively, and the disc cartridge 1 is moved to the inside of the disc holder 47, the supported portions 19 and 19 of the lock sliders 18 and 18 are pressed by the release pieces, respectively. When the supported portions 19 and 19 are pressed to the rear side by the release pieces, respectively, the lock sliders 18 and 18 are moved to the rear side against the urging force of the coil springs, which are not illustrated, respectively, and the lock portions which are not illustrated are drawn from the lock recess portions 29b and 29b of the second shell 4, respectively. When the lock portions are drawn from the lock recess portions 29b and 29b, respectively, the lock of the first shell 3 and the second shell 4 by the lock sliders 18 and 18 is released.

When the lock of the first shell 3 and the second shell 4 by the lock sliders 18 and 18 is released, the first shell 3 and the second shell 4 enter a state in which the first shell 3 and the second shell 4 can be separated in a vertical direction.

In the state in which the first shell 3 and the second shell 4 can be separated, the second shell 4 is unified with the lower holder and moved downward without the first shell 3 being moved downward. Therefore, the first shell 3 and the second shell 4 are separated.

Then, an outer peripheral surface of the disc-shaped recording medium 100 which is present at a height according to a stop position of the lower holder is smoothly pressed to the front side by an eject lever as a pressing portion which is not illustrated herein, and the pressed disc-shaped recording medium 100 is ejected from the second shell 4 to the recording and reproducing unit 88.

Also, the disc-shaped recording medium 100 is loaded in the recording and reproducing unit 88 and recording or reproducing of the information is performed.

[4. Ejection Mechanism of Disc-Shaped Recording Medium]

Figure 5:
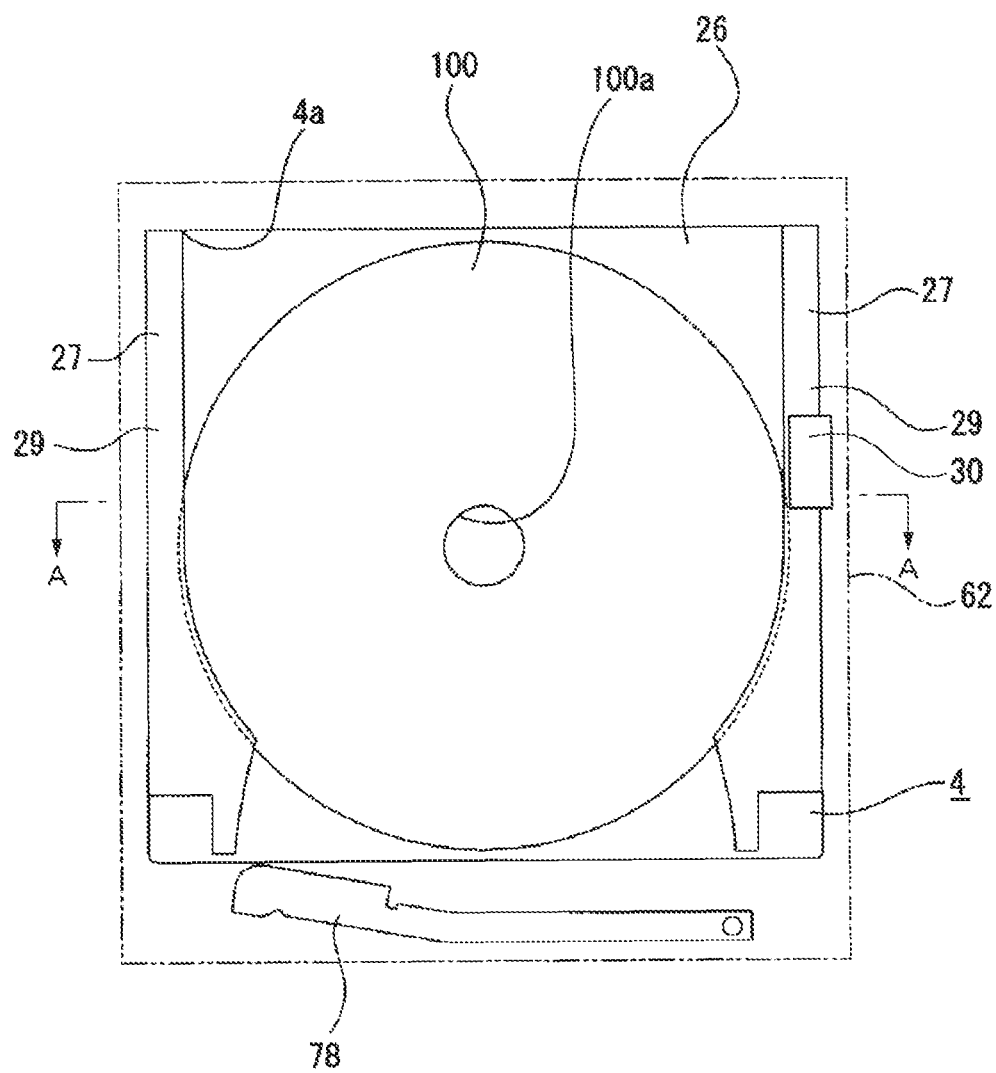
FIG. 5 is a schematic plan view illustrating an example of a state in which a recording medium is accommodated in a cartridge according to an embodiment of this technology.
Figure 6:
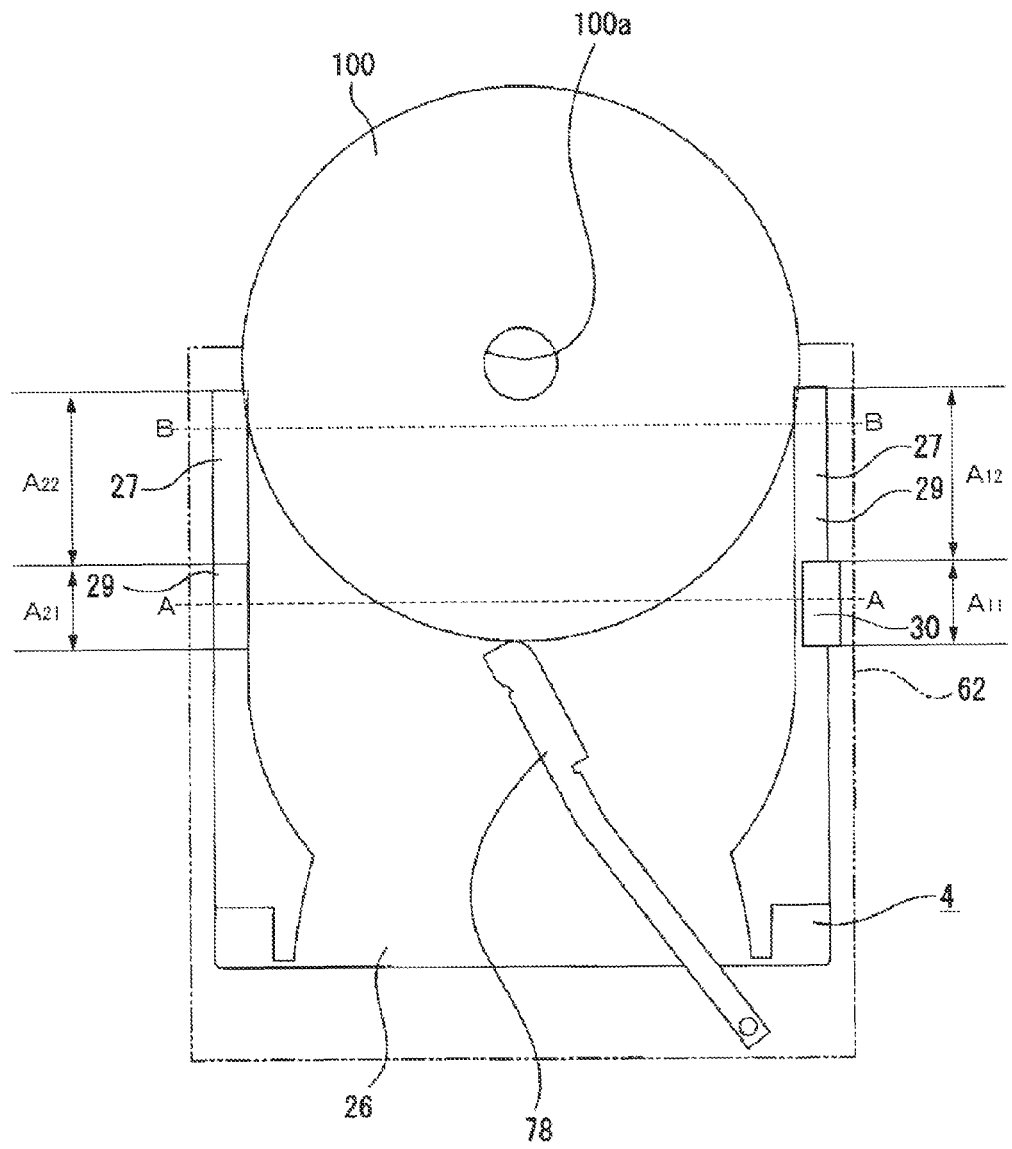
FIG. 6 is a schematic plan view illustrating an example of a state in which a recording medium is ejected by a cartridge according to an embodiment of this technology.

Next, an ejection mechanism of the disc-shaped recording medium 100 will be described. FIG. 5 illustrates an example of a state in which a disc-shaped recording medium 100 is accommodated in the cartridge according to an embodiment of this technology. FIG. 6 illustrates an example of a state in which the disc-shaped recording medium 100 is ejected from the cartridge according to an embodiment of this technology. In FIGS. 5 and 6, a position of the lower holder 62 is indicated by a two-dot chain line together with the second shell 4. Further, the lower holder 62 is movably supported by a holder cover which is not illustrated.

In FIGS. 5 and 6, a base face portion 26, a side surface portion 27, and an inner side wall portion 29 of the second shell 4 are shown. Further, a position in which the self-lock spring 30 is provided is schematically shown. Hereinafter, the inner side wall portion 29 on a side in which the self-lock spring 30 is provided is referred to as a first inner side wall portion 29, and the inner side wall portion 29 on a side facing the self-lock spring 30 is referred to as a second inner side wall portion 29.

In the first inner side wall portion 29, an area A11 and an area A12 are sequentially set in an ejection direction of the disc-shaped recording medium 100. In the second inner side wall portion 29, an area A21 and an area A22 are sequentially set in the ejection direction of the disc-shaped recording medium 100.

The area A11 is an area in which the self-lock spring 30 is provided. The area A21 is an area facing the self-lock spring 30, and the disc-shaped recording medium 100 pressed by the self-lock spring 30 is pressed against this area.

The area A12 is an area in which one end of the disc-shaped recording medium 100 exits from the area A11 and then runs in an ejection operation for the disc-shaped recording medium 100. The area A22 is an area in which the other end of the disc-shaped recording medium 100 exits from the area A21 and then runs in the ejection operation for the disc-shaped recording medium 100.

FIG. 7A is a cross-sectional view taken along a line A-A of FIGS. 5 and 6. FIG. 7B is a cross-sectional view taken along a line B-B of FIG. 6. Disc running grooves 29c, 29c, . . . which are a plurality of disc running grooves for running of the disc-shaped recording medium 100 are provided in inner wall surfaces of the first inner side wall portion 29 and the second inner side wall portion 29, respectively, as shown in FIGS. 7A and 7B. The plurality of disc running grooves 29c, 29c, . . . , extend in the ejection direction of the disc-shaped recording medium 100 (i.e., a horizontal direction), and are arranged at a constant pitch in a height direction (i.e., a vertical direction) of the first inner side wall portion 29 and the second inner side wall portion 29.

The plurality of disc running grooves 29c, 29c, . . . of the first inner side wall portion 29 and the plurality of disc running grooves 29c, 29c, . . . of the second inner side wall portion 29 are provided in positions facing each other, respectively. The disc running grooves 29c and 29c provided in the positions facing each other are paired. Both end portions of the disc-shaped recording medium 100 are fit to the paired disc running grooves 29c and 29c and the disc-shaped recording medium 100 is accommodated in the disc cartridge 1. In FIGS. 7A and 7B, an example in which a plurality of disc-shaped recording media 100, 100, . . . are accommodated is shown.

Portions of the disc running groove 29c corresponding to the areas A21 and A22 include a bottom surface portion 29S, and side surface portions 29B and 29U provided on both sides of the bottom surface portion 29S (see FIGS. 7A and 7B). When the disc-shaped recording medium 100 runs, the bottom surface portion 29S of the disc running groove 29c comes in contact with an end surface of the disc-shaped recording medium 100. Therefore, it is preferable to reduce a static friction coefficient and/or a dynamic friction coefficient of the bottom surface portion 29S.

Portions of the disc running groove 29c corresponding to the area A12 include a bottom surface portion 29S and side surface portions 29B and 29U provided on both sides of the bottom surface portion 29S (see FIG. 7B). On the other hand, the disc running groove 29c includes a slit portion (opening) 29V, and side surface portions 29B and 29U provided on both sides of the slit portion 29V (see FIG. 7A). The spring portions 30b, 30b, . . . of the self-locking spring 30 can be projected from the inner wall surface of the first inner side wall portion 29 through the plurality of slit portions 29V.

Further, the static friction coefficient of the side surface portions 29U and 29B as well as the bottom surface portion 29S may be lower than that of the spring portion 30b of the self-lock spring 30. With such a configuration, it is possible to reduce the static friction coefficient of the disc running groove 29c.

The self-locking spring 30, and the area A21 in the disc running groove 29c facing the self-lock spring 30 have different static friction coefficients. More specifically, the portion of the self-lock spring 30 coming in contact with the end surface of the disc-shaped recording medium 100 and the bottom surface portion 29S in the area A21 coming in contact with the end surface of the disc-shaped recording medium 100 have different static friction coefficients.

It is desirable for the static friction coefficient of the area A21 of the disc running groove 29c facing the self-locking spring 30 to be smaller than the static friction coefficient of the self-lock spring 30. More specifically, it is desirable for the static friction coefficient of the bottom surface portion 29S coming in contact with the end surface of the disc-shaped recording medium 100 in the area A21 to be smaller than that of the portion of the self-lock spring 30 coming in contact with the end surface of the disc-shaped recording medium 100. Accordingly, when the disc-shaped recording medium 100 is pressed to a front side by the ejection lever 78, the disc-shaped recording medium 100 is rotated due to the difference in static friction coefficient between the self-lock spring 30 and the area A21. Also, through this rotation, the disc-shaped recording medium 100 gets over the self-lock spring 30 and arrives at the area A12 of the disc running groove 29c and the area A12 of 29B. Therefore, it is possible to cause the disc-shaped recording medium 100 to smoothly exit from the areas A11 and A21.

It is desirable for fine irregularities to be provided in a portion of the bottom surface portion 29S of the disc running groove 29c corresponding to the area A21. This is because, by reducing the static friction coefficient, the static friction coefficient of the area A21 in the disc running groove 29c facing the self-locking spring 30 can be lower than the static friction coefficient of the self-lock spring 30.

The portion in the disc running groove 29c corresponding to the area A12 and the portion in the disc running groove 29c corresponding to the area A22, for example, have different static friction coefficients. More specifically, the bottom surface portion 29S in the area A12 coming in contact with the end surface of the disc-shaped recording medium 100 and the bottom surface portion 29S in the area A22 coming in contact with the end surface of the disc-shaped recording medium 100 have different static friction coefficients.

As described above, it is desirable to adopt the following configuration when the static friction coefficient of the area A21 in the disc running groove 29c facing the self-locking spring 30 is made lower than the static friction coefficient of the self-lock spring 30. In other words, it is desirable for the static friction coefficient of the portion in the disc running groove 29c corresponding to the area A22 to be smaller than the static friction coefficient of the portion in the disc running groove 29c corresponding to the area A12. More specifically, it is desirable for the friction coefficient of the bottom surface portion 29S coming in contact with the end surface of the disc-shaped recording medium 100 in the area A22 to be smaller than the static friction coefficient of the bottom surface portion 29S coming in contact with the end surface of the disc-shaped recording medium 100 in the area A12.

Accordingly, it is possible to maintain, even in the areas A12 and 22, rotation of the disc-shaped recording medium 100 exiting from the areas A11 and A21. Therefore, it is possible to cause the disc-shaped recording medium 100 to smoothly exit from the areas A11 and A21.

An irregularity shape may be formed in the surface of the disc running groove 29c as one method of reducing the static friction coefficient of the disc running groove 29c. The method of forming this irregularity shape may include, for example, embossing and texturing.

Further, fine particles may be contained in a material of the portion of the disc running groove 29c as one method of reducing the static friction coefficient of the disc running groove 29c. For example, fine particles may be contained in the material of the portion of the disc running groove 29c, and some of the fine particles may be projected from the surface of the disc running groove 29c. Further, for example, a resin layer containing fine particles may be provided on the surface of the disc running groove 29c, and the fine particles may be projected from the surface of this resin layer.

For example, at least one of fine organic particles and fine inorganic particles may be used as the fine particles. Hollow fine particles may be used as the fine particles. The fine particles include, for example, fine inorganic particles such as silica or alumina or fine organic particles such as styrene, acrylic or a copolymer thereof, but the silica fine particles are particularly preferred.

Further, as one method of reducing the static friction coefficient of the disc running groove 29c, a material having a small static friction coefficient may be used for the material of the portion of the disc running groove 29c. For example, a fluorine resin, and more specifically, polytetrafluoroethylene may be used.

Further, a lubricant may be applied to a portion of the disc running groove 29c as one method of reducing the static friction coefficient of the disc running groove 29c.

Effects of the Embodiment

In the embodiment of this technology, in the disc cartridge 1 having running grooves of the disc-shaped recording medium 100 accommodated in a main body, the static friction coefficient of one groove is smaller than the static friction coefficient of the other groove. Accordingly, it is possible to eject the disc-shaped recording medium 100 from the disc cartridge while rotating the disc-shaped recording medium 100. Therefore, it is possible to suppress a force necessary to eject the disc-shaped recording medium 100, and to stably eject the disc-shaped recording medium 100. Further, it is possible to suppress chipping of the end surface at the time of ejecting the disc-shaped recording medium 100. Therefore, it is possible to suppress a decrease in durability of the disc-shaped recording medium 100.

Further, the ejection of the disc-shaped recording medium 100 has been particularly described herein. However, in this technology, the same effect is obtained at the time of insertion of the disc-shaped recording medium 100 into the disc cartridge 1.

The disc-shaped recording medium 100 is rotated using a side in which a frictional force is high as a fulcrum as a difference is generated in a frictional force between the spring portion 30b of the self-lock spring 30 whose frictional force is maximized when the disc-shaped recording medium 100 is extruded from the disc cartridge 1 and the disc running groove 29c on the opposite side. The disc-shaped recording medium 100 passes through the spring portion 30b by rolling instead of slipping. Since the static friction coefficient is different from that of the disc running groove 29c, there is no dependence on a state of the end surface of the disc-shaped recording medium 100. Therefore, in this technology, the effects thereof are exhibited without selecting the disc-shaped recording medium 100 to be used.

Further, it is difficult for a stick-slip phenomenon which will be described later to occur since there is a difference in frictional force between the end surface of the disc-shaped recording medium 100 and the two facing disc running grooves 29c and 29c. Therefore, a force for extruding the disc-shaped recording medium 100 is reduced and the disc-shaped recording medium 100 is stably extruded from the disc cartridge 1.

Further, in addition to the configuration described above, the static friction coefficient of the disc running groove 29c on the opposite side may be lower than that of the spring portion 30b for the portion (indicated by A22 in FIG. 6) in which the disc-shaped recording medium 100 is ejected by getting over the self-lock spring 30. According to such a configuration, since there is a difference in the frictional force between the end surface of the disc-shaped recording medium 100 and each of the two facing disc running grooves 29c and 29c, the disc-shaped recording medium 100 moves while rotating even after passing through the spring portion 30b of the self-lock spring 30. Therefore, in addition to the effects described above, chipping is prevented at the time of ejection of the disc-shaped recording medium 100 without the disc-shaped recording medium 100 sliding in a specific position.

Embodiment

Hereinafter, this technology will be concretely described based on embodiments, but this technology is not limited to only these embodiments. The embodiment of this technology will be described in the following order with reference to the drawings. 1. Comparison Example 1 (an example in which the frictional force of the groove is not changed). 2-1. Embodiment 2-1 (an example in which the frictional force of the groove on an opposite side is small). 2-2. Embodiment 2-2 (an example in which frictional forces of grooves on both the self-lock spring portion side and the opposite side are small). 2-3. Reference example (an example in which the frictional force of the groove on the self-lock spring portion side is small). 2-4. Comparison Example 2 (an example in which the frictional force of the groove is not changed).

1. Comparison Example 1

An Example in which the Frictional Force of the Groove is not Changed

Figure 8:
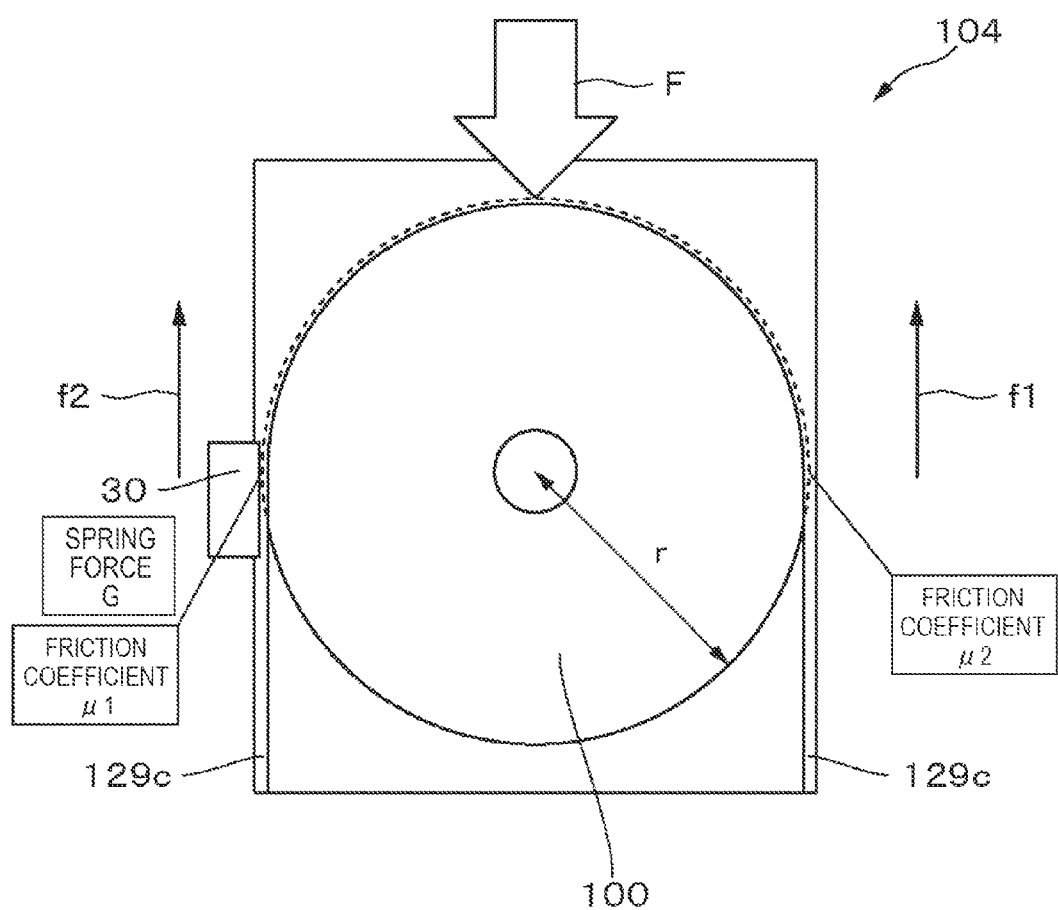
FIG. 8 is a schematic diagram illustrating a force generated when a recording medium is ejected from a cartridge.

A force generated when a recording medium is ejected from a cartridge will be described with reference to FIGS. 8, 9A and 9B. FIG. 8 schematically illustrates a force generated when a recording medium is ejected from a cartridge. FIGS. 9A and 9B illustrate a change in force necessary for ejection of the recording medium from the cartridge. Further, in FIG. 8, the ejection direction of the recording medium described above is shown as an opposite direction to the direction in FIGS. 5 and 6.

FIG. 8 illustrates a configuration in which a disc-shaped recording medium 100 is accommodated in a second shell 104 of the disc cartridge of Comparison Example 1. A pair of two disc running grooves 129c and 129c provided in the second shell 104 support an outer edge portion of the disc-shaped recording medium 100 having a radius r. The disc-shaped recording medium 100 is movable on the disc running groove 129c in parallel to the surface thereof. The self-lock spring 30 is provided in one of the disc running grooves 129c.

Thus, a frictional force was generated when the disc-shaped recording medium 100 passed through the self-lock spring 30 in the cartridge having the disc running grooves in which insertion and removal of the disc-shaped recording medium 100 was performed. More specifically, the disc-shaped recording medium 100 was sandwiched between the self-lock spring 30 and the disc running groove 129c on the opposite side, and the frictional force between the self-lock spring 30 and the disc-shaped recording medium 100 and the frictional force between the disc running groove 129c on the opposite side and the disc-shaped recording medium 100 were generated by a force of the spring.

A stick-slip phenomenon might occur due to the generated friction according to a state of surface finish of the disc running groove 129c and the self-lock spring 30 and a state of the end surface of the disc-shaped recording medium 100. Further, the stick-slip is a phenomenon in which an object repeatedly stops due to friction or slides when an object and an object perform sliding motion. For example, the stick-slip phenomenon easily occurred when a resin was applied to the end surface of the disc-shaped recording medium 100.

Also, when the frictional force between the self-lock spring 30 and the disc-shaped recording medium 100 and the frictional force between the disc running groove 129c on the opposite side and the disc-shaped recording medium 100 described above were balanced, a force necessary to extrude the disc-shaped recording medium 100 was changed and the disc-shaped recording medium 100 might not be stably extruded.

A maximum force necessary for extrusion of the disc-shaped recording medium 100 when the stick-slip phenomenon does not occur, for example, was about 1 [N], as illustrated in FIG. 9A. On the other hand, the maximum force necessary for extrusion of the disc-shaped recording medium 100 when the stick-slip phenomenon occurred was about 2.5 [N], and an approximately doubled force was necessary in comparison with the case in which the stick-slip phenomenon did not occur, as illustrated in FIG. 9B.

Here, the force necessary when the disc-shaped recording medium 100 is extruded from the disc cartridge (the second shell 104) described above is shown in an equation.

Here, when the force necessary for extrusion is F, the static friction coefficient between the groove and the disc-shaped recording medium 100 is μ1, a maximum static frictional force thereof is f1, a static friction coefficient between the spring and the disc-shaped recording medium 100 is μ2, a maximum static frictional force thereof is f2, and a pressing force of the spring is G, the following equation is obtained.

$$\begin{aligned} F &= f1 + f2 \\ &= \mu1 \cdot G + \mu2 \cdot G \\ &= G(\mu1 + \mu2) \end{aligned} \quad (1)$$

When the stick-slip phenomenon occurs, the disc-shaped recording medium 100 is not rotated and is balanced. In other words, μ1=μ2 is satisfied, and the force necessary for extrusion is F=G·μ1 and is proportional to μ1. For example, a difference was generated in the static friction coefficient μ1 between the groove and the disc-shaped recording medium 100 due to the difference between the state of the end surface of the disc-shaped recording medium 100 used in FIG. 9A and the state of the end surface of the disc-shaped recording medium 100 used in FIG. 9B, and as a result, a difference was generated in the force F necessary for extrusion.

Therefore, it is inferred that it is effective to lower the static friction coefficient of the groove in order to reduce the force F necessary for extrusion. One method of reducing a static friction coefficient of a surface of plastic or the like includes texturing. However, when texturing is simply performed on the grooves on both sides to lower the static friction coefficient and the disc-shaped recording medium 100 slides in a specific position, formed grains are likely to cut the end surface of the disc-shaped recording medium 100 like a file.

2-1. Embodiment 2-1

Figure 10:
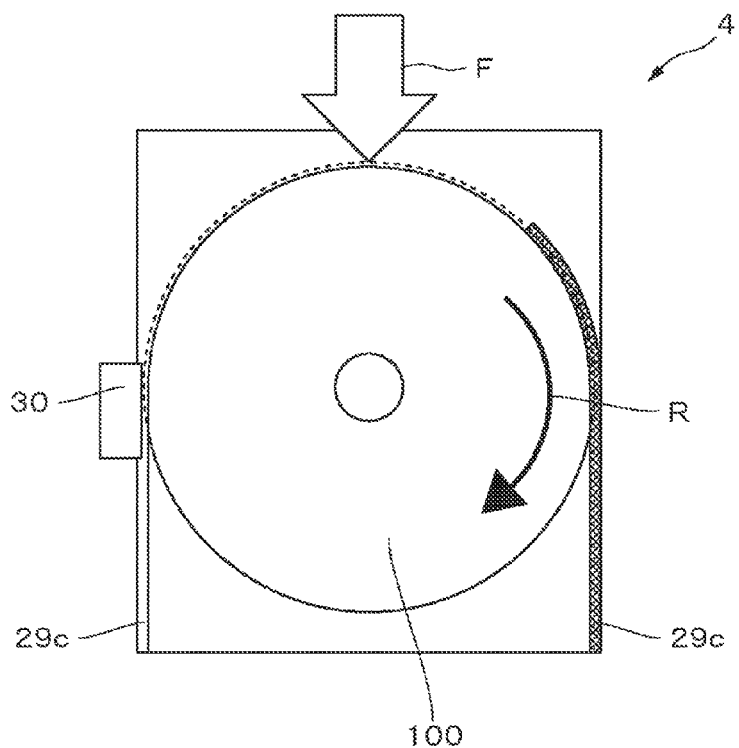
FIG. 10 is a schematic diagram illustrating a cartridge of Embodiment 2-1.

An Example in which the Frictional Force of the Groove on the Opposite Side is Small FIG. 10 illustrates a disc cartridge 1 (a second shell 4) of Embodiment 2-1. Further, a configuration of the disc cartridge 1 in Embodiment 2-1 corresponds to the configuration of the embodiment described above. In Embodiment 2-1, processing was performed so that a frictional force of the disc running groove 29c on the opposite side to a side in which the self-lock spring 30 is provided is smaller. More specifically, glass beads (grain number 150) having a particle size raging from 125 to 106 [μm] were applied on the disc running groove 29c on the opposite side. The disc-shaped recording medium 100 was extruded from the disc cartridge 1, and a force for extrusion of an extrusion member which is not illustrated when the disc-shaped recording medium 100 moved was measured. A direction of the force F necessary for extrusion of the disc-shaped recording medium 100 is indicated by an arrow in FIG. 10.

2-2. Embodiment 2-2

Figure 11:
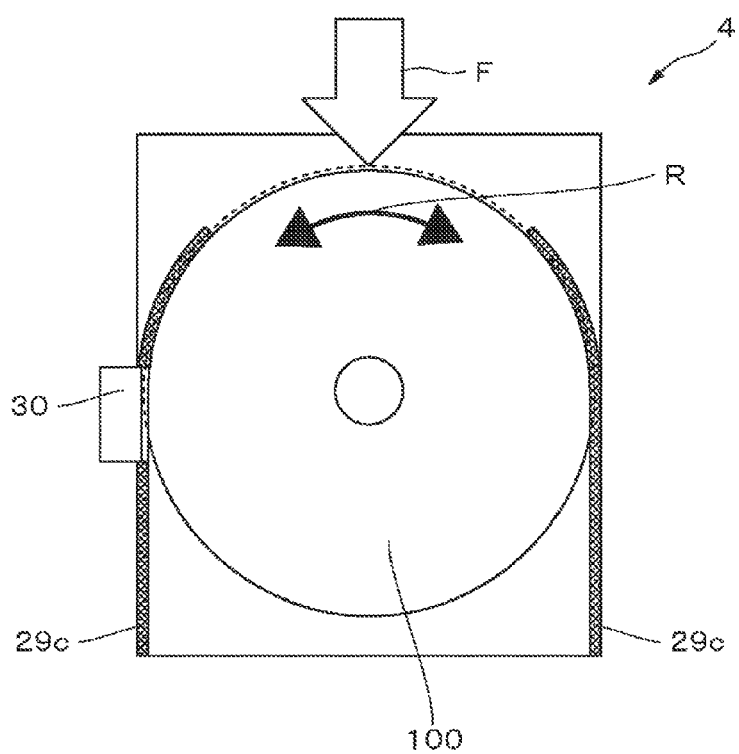
FIG. 11 is a schematic diagram illustrating a cartridge of Embodiment 2-2.

An Example in which the Frictional Forces of Grooves on Both the Self-Lock Spring Portion Side and the Opposite Side are Small FIG. 11 illustrates a disc cartridge 1 (a second shell 4) of Embodiment 2-2. In Embodiment 2-2, processing was performed so that frictional forces of the disc running grooves 29c on both the side in which the self-lock spring 30 is provided and the opposite side were small. More specifically, glass beads (grain number 150) having a particle size ranging from 125 to 106 [μm] were applied on the disc running grooves 29c on both the self-lock spring 30 side and the opposite side. Further, the glass beads were not applied to a portion of the self-lock spring 30. Also, the disc-shaped recording medium 100 was extruded from the disc cartridge 1 and the force thereof was measured, similar to Embodiment 2-1. In FIG. 11, a direction of the force F necessary for extrusion of the disc-shaped recording medium 100 is indicated by an arrow.

2-3. Reference Example

Figure 12:
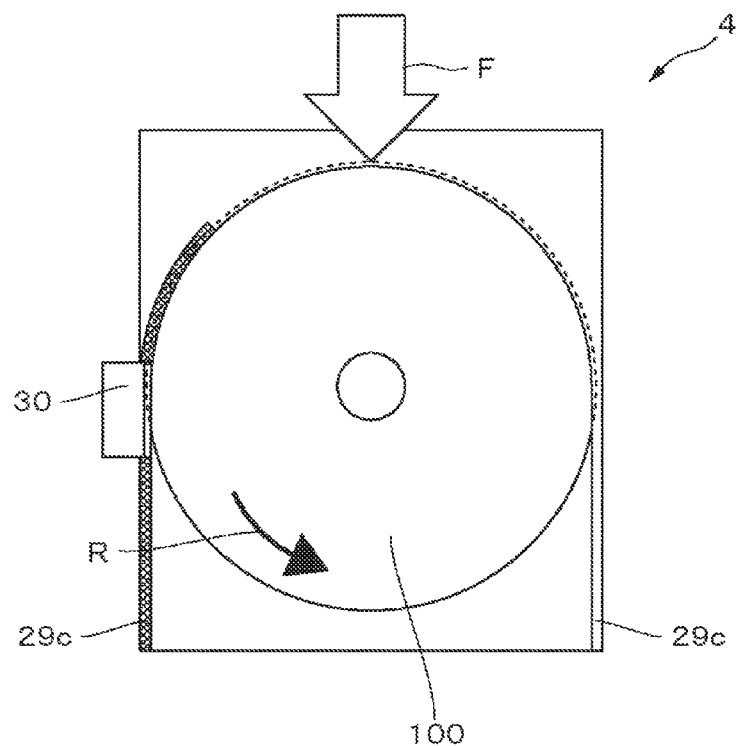
FIG. 12 is a schematic diagram illustrating a cartridge of a reference example.

An Example in which the Frictional Force of the Groove on the Self-Lock Spring Portion Side is Small FIG. 12 illustrates a disc cartridge 1 (a second shell 4) of a reference example. In the reference example, processing was performed so that a frictional force of the disc running groove 29c on the side in which the self-lock spring 30 was provided was small. More specifically, glass beads (grain number 150) having a particle size ranging from 125 to 106 [μm] were applied on the disc running groove 29c on the self-lock spring 30 side. Further, the glass beads were not applied to a portion of the self-lock spring 30. Also, the disc-shaped recording medium 100 was extruded from the disc cartridge 1 and a force thereof was measured, similar to Embodiment 2-1. A direction of the force F necessary for extrusion of the disc-shaped recording medium 100 is indicated by an arrow in FIG. 12.

2-4 Comparison Example 2

An Example in which a Frictional Force of the Groove is not Changed

Figure 13:
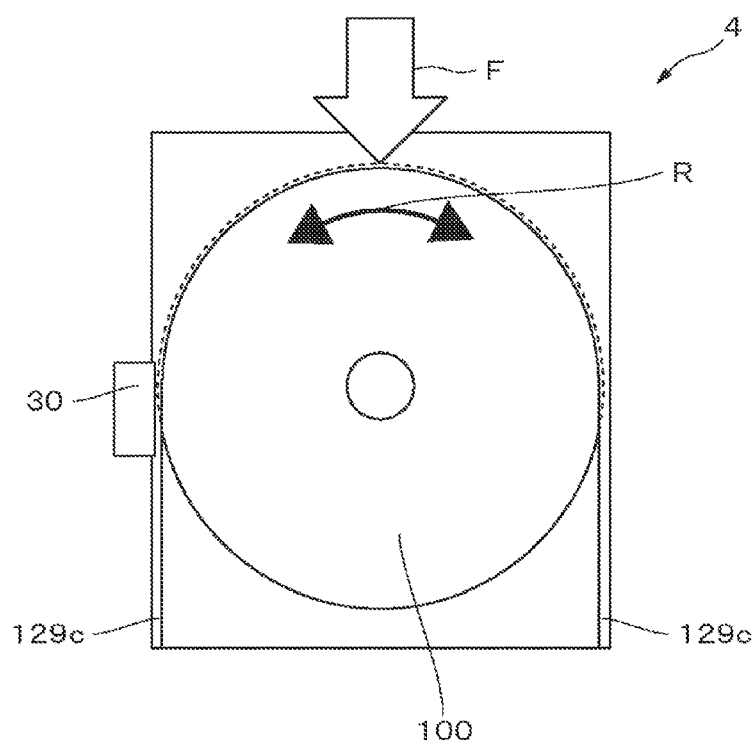
FIG. 13 is a schematic diagram illustrating a cartridge of Comparison Example 2.

FIG. 13 illustrates a disc cartridge of Comparison Example 2. In Comparison Example 2, processing was not particularly performed on the disc running groove 129c. Also, the disc-shaped recording medium 100 was extracted from the disc cartridge of Comparison Example 2 and the force thereof was measured, similar to Embodiment 2-1. In FIG. 13, a direction of the force F necessary for extrusion of the disc-shaped recording medium 100 is indicated by an arrow.

(Change in Extrusion Force)

FIGS. 14A and 14B and FIGS. 15A and 15B illustrate changes in force when the disc-shaped recording medium 100 is extruded from the disc cartridge 1. For a measured value, a force necessary when the disc-shaped recording medium 100 gets over a portion of the self-lock spring 30 is shown. Further, FIG. 14A illustrates Embodiment 2-1, FIG. 14B illustrates Embodiment 2-2, FIG. 15A illustrates a reference example, and FIG. 15B illustrates Comparison Example 2.

The following is seen from FIGS. 10 and 14A.

In Embodiment 2-1, in a portion of the self-lock spring 30, an extrusion movement of the disc-shaped recording medium 100 did not stop and the disc-shaped recording medium 100 was smoothly extruded. An extrusion force in the portion of the self-lock spring 30 was about 1.1 [N], which was about ½ of Comparison Example 2 which will be described below.

A rotation direction R of the disc-shaped recording medium 100 was clockwise from extrusion start, and the disc-shaped recording medium 100 passed through the portion of the self-lock spring 30 while rotating. Since the disc-shaped recording medium 100 passed through the portion of the self-lock spring 30 while rolling instead of slipping, it is inferred that extrusion force was small.

The following is seen from FIGS. 11 and 14B.

In Embodiment 2-2, the disc-shaped recording medium 100 was extruded while shaking between the facing disc running grooves 29c and 29c. However, the extrusion force in the portion of the self-lock spring 30 was about 1.5 [N], which was about ½ of Comparison Example 2 which will be described below. It was inferred from this result that the disc-shaped recording medium 100 passed through the portion of the self-lock spring 30 while rotating.

The rotation direction R of the disc-shaped recording medium 100 was not constant.

The following is seen from FIGS. 12 and 15A.

In the reference example, the disc-shaped recording medium 100 was extruded while shaking between the facing disc running grooves 29c and 29c. In a portion of the self-lock spring 30, a frictional force between the disc-shaped recording medium 100 and the two disc running grooves 29c and 29c was balanced and an extrusion movement of the disc-shaped recording medium 100 stopped once. When the extrusion force increased to about 2.5 [N], the disc-shaped recording medium 100 was freed from the pressing force of the self-lock spring 30 and extruded while rotating counterclockwise. Since the disc-shaped recording medium 100 reversely rotated, it was inferred that the extrusion force increased in the portion of the self-lock spring 30.

The rotation direction R of the disc-shaped recording medium 100 was not constant until the disc-shaped recording medium 100 arrived at the portion of the self-lock spring 30, and the disc-shaped recording medium 100 rotated counterclockwise after passing through the portion of the self-lock spring 30.

The following is seen from FIGS. 13 and 15B.

In Comparison Example 2, the disc-shaped recording medium 100 was extruded while shaking between the disc running grooves 129c and 129c, and an extrusion movement stopped once in the portion of the self-lock spring 30, similar to the reference example described above. When the extrusion force increased to 2.5 [N], the extrusion started again and then the disc-shaped recording medium 100 was extruded while shaking between the disc running grooves 129c and 129c. Since the self-lock spring 30 of a resin material was used, it was inferred that the frictional forces in the portion of the self-lock spring 30 were balanced, the disc-shaped recording medium 100 passed, and the extrusion force increased.

The rotation direction R of the disc-shaped recording medium 100 was not constant.

As described above, the disc-shaped recording medium 100 was inserted, and a difference was generated in frictional force between the portion of the self-lock spring 30 in which the frictional force became maximum and the groove on the opposite side in the cartridge having the disc running grooves of the recording medium to verify the effects thereof. As a result, it was confirmed that the disc-shaped recording medium 100 was rotated using the side in which the static friction coefficient is high as the fulcrum, and stably extruded without depending on the state of the end surface of the disc-shaped recording medium 100. Further, the necessary extrusion force of about 2.5 [N] could be reduced to about ½ by lowering the static friction coefficient of the bottom surface portion 29S of the disc running groove 29c, and the disc-shaped recording medium 100 could be smoothly extruded.

In the above verification, reduction of the frictional force was realized using glass beads. However, as a scheme for realizing the reduction of the frictional force, texturing may be performed on the cartridge of a molded product from ease of the implementation. When texturing is performed on the disc running groove, the stick-slip phenomenon and peeling of the disc end surface may be considered. It is more desirable for a state of the surface for which texturing is performed on the groove on the opposite side to the self-lock spring 30 to be a surface roughness Rz (J1594 standard) of, for example, 9±3 [μm] in consideration of these.

A distance between the two facing disc running grooves 29c and 29c is greater than a diameter of the disc-shaped recording medium 100. Therefore, there is a gap between the bottom surface portion 29S of the disc running groove 29c and the end surface of the disc-shaped recording medium 100. In the case of such a configuration, the end surface of the extruded disc-shaped recording medium 100 repeatedly contacts the bottom surface portions 29S of the two disc running grooves 29c and 29c and the disc-shaped recording medium 100 moves. In this case, when a difference in frictional force between the two disc running grooves 29c and 29c is provided, the same effects as the portion of the self-lock spring 30 described above can be achieved.

Further, a configuration in which the static friction coefficient of the disc running groove 29c on the self-lock spring 30 side, as well as the disc running groove 29c on the opposite side to the self-lock spring 30 is reduced may be used. More specifically, an irregularity shape having less surface roughness than described above may be formed in the disc running groove 29c on the self-lock spring 30 side, e.g., texturing may be performed on the disc running groove 29c on the self-lock spring 30 side to reduce an entire static friction coefficient. It is possible to obtain a cartridge having a small entire frictional force and having a difference in frictional force between the disc running groove 29c on the self-lock spring 30 side and the disc running groove 29c on the opposite side with respect to the disc-shaped recording medium 100 by performing such processing. In the cartridge having such a configuration, it is possible to lower the force necessary for extrusion of the disc-shaped recording medium 100 and to enable the disc-shaped recording medium 100 to pass through the portion of the self-lock spring 30 while rotating.

Additionally, the present technology may also be configured as below.

(1)
A cartridge including:
a running portion which causes both end portions of a disc-shaped recording medium to run; and
a pressing portion which presses one end portion of the disc-shaped recording medium to press the other end portion against the running portion,
wherein static friction coefficients of a portion of the pressing portion coming in contact with the one end portion and a portion of the running portion coming in contact with the other end portion are different.

(2)
The cartridge according to (1), wherein the static friction coefficient of the portion of the running portion coming in contact with the other end portion is smaller than the static friction coefficient of the portion of the pressing portion coming in contact with the one end portion.

(3)
The cartridge according to (1) or (2),
wherein the running portion includes,
a first running area which causes the one end portion of the disc-shaped recording medium to run, and
a second running area which causes the other end portion of the disc-shaped recording medium to run, and
wherein friction coefficients of the first running area and the second running area are different.

(4)
The cartridge according to any one of (1) to (3),
wherein the pressing portion is provided on a first running area side, and
wherein a static friction coefficient of the second running area is smaller than the friction coefficient of the first running area.

(5)
The cartridge according to any one of (1) to (4),
wherein the running portion includes a surface coming in contact with the end surface of the disc-shaped recording medium, and
the other end portion of the disc-shaped recording medium is pressed against the surface by the pressing portion.

(6)
The cartridge according to any one of (1) to (5), wherein irregularities are provided on the portion of the running portion coming in contact with the other end portion.

(7)
The cartridge according to any one of (1) to (6), wherein the pressing portion is an elastic body.

(8)
The cartridge according to (7), wherein the elastic body is a spring member including a resin material.

(9)
A recording and reproducing apparatus including:
a running portion which causes both end portions of a disc-shaped recording medium to run;
a first pressing portion which presses one end portion of the disc-shaped recording medium to press the other end portion against the running portion; and
a second pressing portion which presses the disc-shaped recording medium to cause the recording medium to run,
wherein static friction coefficients of a portion of the first pressing portion coming in contact with the one end portion and a portion of the running portion coming in contact with the other end portion are different.

The embodiments and examples of the present technology have been described specifically above. However, the present technology is not limited to the above-described embodiments and examples, but may be modified in various ways based on the technical sprit of the present technology. For example, the configurations, the methods, the processes, the shapes, the materials, the numerical values, and the like mentioned in the above-described embodiments and examples are merely examples. Different configurations, methods, processes, shapes, materials, numerical values, and the like may be used, as necessary.

Further, configuration, methods, processes, shapes, materials, numerical values and the like in the above-described embodiments and examples may be combined insofar as they do not depart from the spirit of the present technology. For example, the recording and reproducing apparatus and the cartridge may have an integral structure.

It should be understood by those skilled in the art that various modifications, combinations, sub-combinations and alterations may occur depending on design requirements and other factors insofar as they are within the scope of the appended claims or the equivalents thereof.

What is claimed is:

1. A cartridge comprising:
    a running member which causes a disc-shaped recording medium to run, wherein the disc-shaped recording medium comprises a first edge portion and a second edge portion; and
    a pressing member which presses the first edge portion of the disc-shaped recording medium, to press the second edge portion against the running member,
    wherein a first static friction coefficient of a portion of the pressing member that comes in contact with the first edge portion is different than a second static friction coefficient of a portion of the running member that comes in contact with the second edge portion,
    wherein a difference between the first static friction coefficient and the second static friction coefficient causes the disc-shaped recording medium to rotate between the running member and the pressing member.

2. The cartridge according to claim 1, wherein the second static friction coefficient of the portion of the running member that comes in contact with the second edge portion is smaller than the first static friction coefficient of the portion of the pressing member that comes in contact with the first edge portion.

3. The cartridge according to claim 1,
    wherein the running member comprises:
        a first running area which causes the first edge portion of the disc-shaped recording medium to run, and
        a second running area which causes the second edge portion of the disc-shaped recording medium to run, and
        wherein a static friction coefficient of the first running area and a static friction coefficient of the second running area are different.

4. The cartridge according to claim 3,
    wherein the pressing member is provided on the first running area side, and
    wherein the static friction coefficient of the second running area is smaller than the static friction coefficient of the first running area.

5. The cartridge according to claim 1,
    wherein the running member comprises a surface that comes in contact with the second edge portion of the disc-shaped recording medium, and
    the second edge portion of the disc-shaped recording medium is pressed against the surface by the pressing member.

6. The cartridge according to claim 1, wherein irregularities are provided on the portion of the running member that comes in contact with the second edge portion of the disc-shaped recording medium.

7. The cartridge according to claim 1, wherein the pressing member is an elastic body.

8. The cartridge according to claim 7, wherein the elastic body is a spring member that comprises a resin material.

9. A recording and reproducing apparatus comprising:
    a running member which causes a disc-shaped recording medium to run, wherein the disc-shaped recording medium comprises a first edge portion and a second edge portion;
    a first pressing member which presses the first edge portion of the disc-shaped recording medium, to press the second edge portion against the running member; and
    a second pressing member which presses the disc-shaped recording medium to cause the disc-shaped recording medium to run,
    wherein a first static friction coefficient of a portion of the first pressing member that comes in contact with the first edge portion is different than a second static friction coefficient of a portion of the running member that comes in contact with the second edge portion,
    wherein a difference between the first static friction coefficient and the second static friction coefficient causes the disc-shaped recording medium to rotate between the running member and the first pressing member.

10. The cartridge according to claim 1, wherein the difference between the first static friction coefficient and the second static friction coefficient causes the disc-shaped recording medium to rotate and eject from the cartridge.

11. The cartridge according to claim 1, wherein the difference between the first static friction coefficient and the second static friction coefficient causes the disc-shaped recording medium to rotate and insert into the cartridge.

12. The cartridge according to claim 1, wherein the first edge portion and the second edge portion are located opposite to each other.

13. The cartridge according to claim 1, further comprising a lever member which presses a third edge portion of the disc-shaped recording medium to cause the disc-shaped recording medium to run.

* * * * *